Jan. 31, 1961  H. F. ANDERSON  2,970,022
PISTON RING ASSEMBLIES AND ELEMENTS THEREOF
Filed July 5, 1960  2 Sheets-Sheet 1
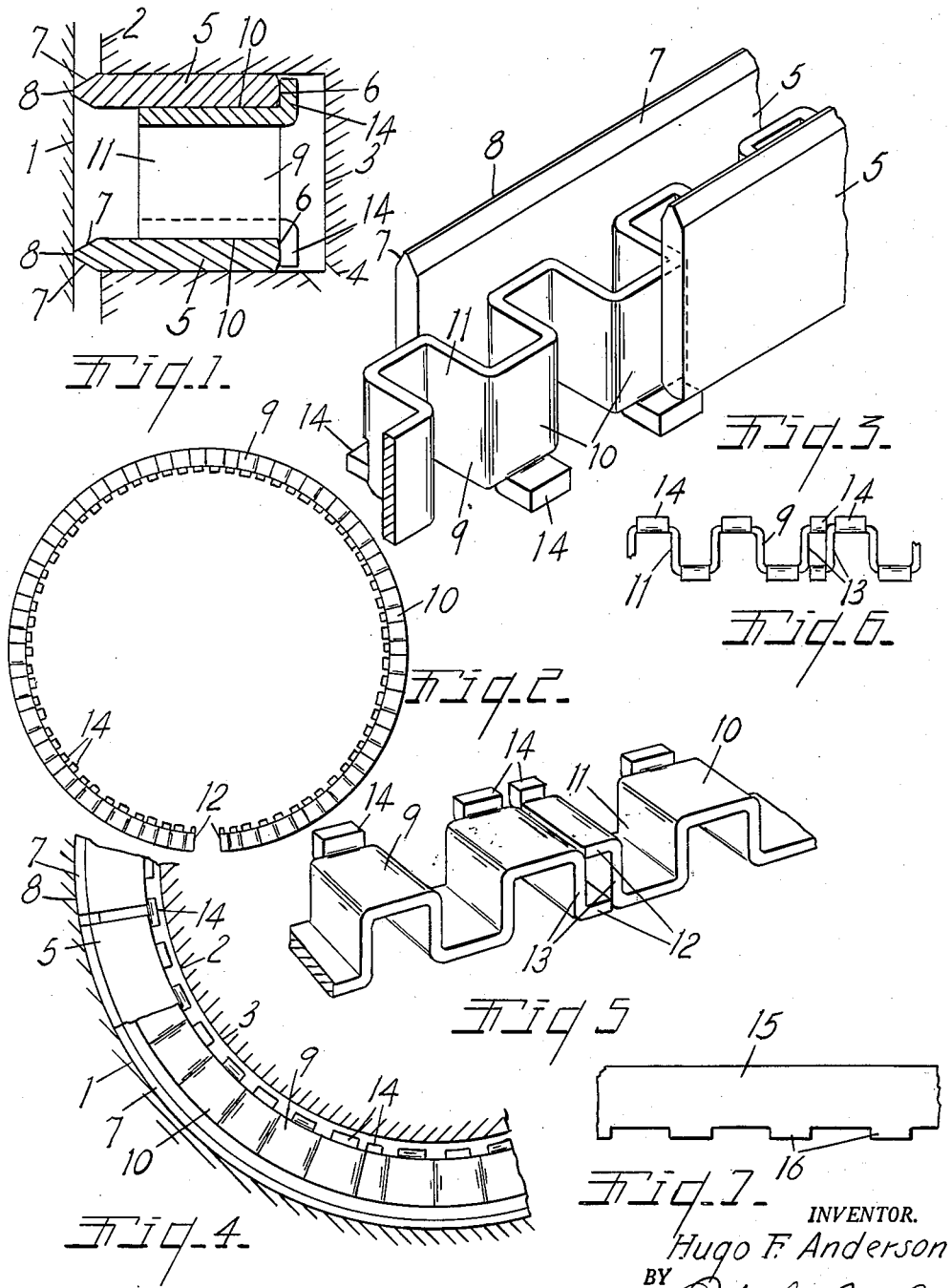
INVENTOR.
Hugo F. Anderson
BY
ATTORNEY.

Jan. 31, 1961   H. F. ANDERSON   2,970,022
PISTON RING ASSEMBLIES AND ELEMENTS THEREOF
Filed July , 1960   2 Sheets-Sheet 2

INVENTOR.
Hugo F. Anderson
BY
ATTORNEY.

United States Patent Office 2,970,022
Patented Jan. 31, 1961

2,970,022

PISTON RING ASSEMBLIES AND ELEMENTS THEREOF

Hugo F. Anderson, Hastings, Mich., assignor to Hastings Manufacturing Company, Hastings, Mich.

Filed July 5, 1960, Ser. No. 40,824

15 Claims. (Cl. 309—44)

This invention relates to improvements in piston ring assemblies and elements thereof.

The main objects of this invention are:

First, to provide a piston ring assembly which is adapted for installation in piston ring grooves of varying depths.

Second, to provide a piston ring assembly comprising cylinder wall engaging elements and a combined intermediate spacer and expander member which may be very economically produced and is easily installed.

Third, to provide a combined spacer and expander member for piston ring elements formed of resilient ductile metal stock in which the abutting ends are engaged so that they cannot overlap when installed in use as a result of use stresses.

Fourth, to provide an annular combined spacer and expander element formed of ribbon stock and including ring abutment members which in manufacture can be disposed at different angular relations to support the cylinder wall engaging ring elements in inwardly or outwardly or tilted relation relative to each other or in substantially parallel relation.

Objects relating to details and economies of the invention will appear from the description to follow. The invention is defined and pointed out in the claims.

A preferred embodiment of the invention is illustrated in the accompanying drawing, in which:

Fig. 1 is a fragmentary longitudinal section of a cylinder and associated piston with the ring assembly of my invention installed therein, the cylinder and piston being shown conventionally and without regard to relative dimensions. The parts are shown greatly enlarged and without regard to clearances and tolerances.

Fig. 2 is a side elevation of the spacer and expander of my invention in nonuse position.

Fig. 3 is a fragmentary perspective view of the ring assembly embodying my invention.

Fig. 4 is a fragmentary view of a ring assembly of my invention installed in a piston ring groove, the piston and cylinder being conventionally illustrated and parts being broken away to show the installed relationship of the ring elements and the combined expander and spacer.

Fig. 5 is an enlarged perspective view of the combined spacer and expander element.

Fig. 6 is a fragmentary top or outside view showing the ring element supporting lugs and their relation on the meeting end of the expander member.

Fig. 7 is a fragmentary side view of a strip of metal of which the embodiment of the spacer expander member shown in Figs. 1 to 6 inclusive is formed.

Figure 8:
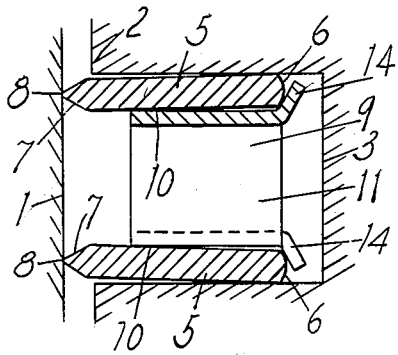
Fig. 8 is a view corresponding to that of Fig. 1 in which the supporting lugs for the ring elements are disposed at an inwardly inclined angle so that the ring elements are tilted inwardly or toward each other.

In the accompanying drawing 1 represents a cylinder and 2 a piston having a piston ring groove 3 therein, the groove desirably having a drain opening 4.

It will be understood that no attempt has been made to show these parts in their operative proportions or use tolerances; a drain opening is indicated only in Fig. 1.

The piston ring elements 5, commonly designated rails, are formed of ribbon steel coiled edgewise with substantially flat sides and desirably having transversely curved inner edges 6 and tapered outer edges 7 providing a cylinder wall contacting edge 8 of substantially less width than the thickness of the elements. These piston ring elements are desirably provided with chrome plated cylinder wall edges, as is illustrated in the Phillips Patent No. 2,712,971, July 12, 1955; and the present invention is an improvement upon that of the Phillips Patent No. 2,656,230, issued October 20, 1953.

Figure 9:
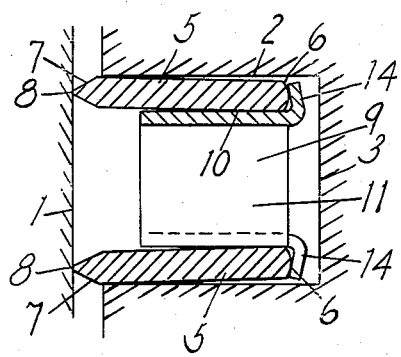
Fig. 9 is a fragmentary view corresponding to that of Figs. 1 and 8 in which the ring supporting lugs are disposed in outwardly inclined angular relation resulting in tilting the ring elements with their outer portions against the outer edges of the piston ring groove.
Figure 10:
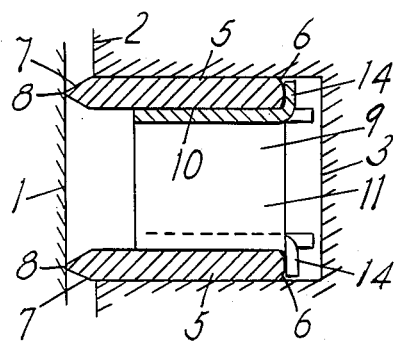
Fig. 10 is a fragmentary sectional view corresponding to that of Fig. 1 illustrating a modified form or embodiment of my invention.
Figure 11:
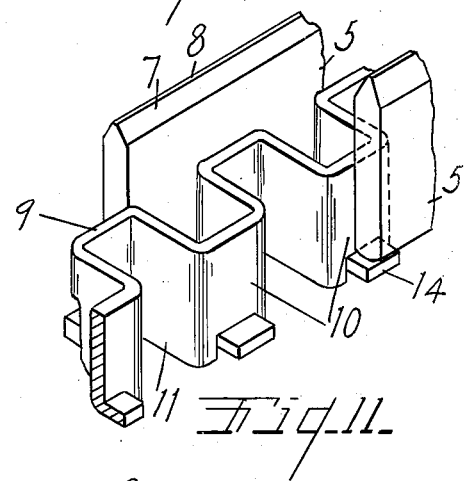
Fig. 11 is a fragmentary perspective view corresponding to that of Fig. 3 of a modified form or embodiment of my invention.
Figure 12:
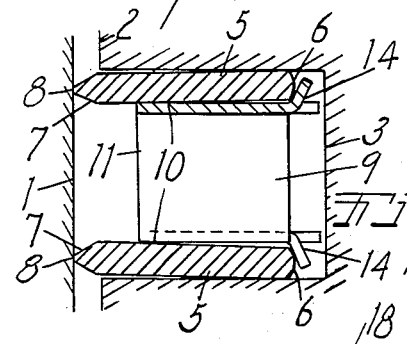
Fig. 12 is a fragmentary sectional view corresponding to that of Fig. 8 illustrating a modification of the embodiment of Fig. 10 to tilt the cylinder wall engaging element or rails in inwardly tilted position.
Figure 13:
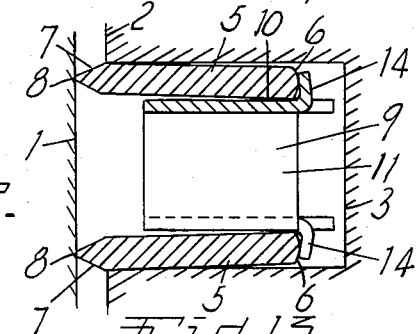
Fig. 13 is a fragmentary sectional view illustrating an adaptation of my invention to tilt the piston ring rails or elements outwardly.
Figure 14:
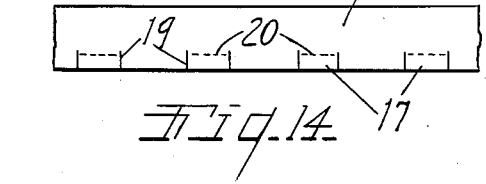
Fig. 14 is a fragmentary view of a section of a piece of ductile metal from which the combined spacer and expander member of the embodiment of my invention illustrated in Figs. 10, 11 and 12 is formed.

The combined spacer and expander element designated generally by the numeral 9 is formed of ribbon steel stock corrugated sidewise to provide a plurality of bight portions 10 having flat piston ring element supporting facings and connecting reaches 11. These combined spacer and expander elements terminate at both ends in the bight portions 12 which are in abutting engagement with the end reaches 13 when the ring assembly is installed in a piston ring groove, see Fig. 5. The bights 10 have lug-like abutments 14 projecting laterally from the lower edges thereof, these being bent at right angles to the bight portions of the combined spacing and expanding member, as is illustrated in Figs. 1 to 6 inclusive. To meet certain desired conditions they are disposed in inwardly inclined relation as illustrated in Fig. 8 which results in tilting the cylinder wall engaging rails or members 5 inwardly toward each other, or the lugs may be disposed at an outwardly inclined angle, as illustrated in Fig. 9, which results in tilting the ring members or rails 5 outwardly relative to each other and against the sides of the piston ring groove.

In all of these embodiments the combined expander and spacer member is formed of a strip of ribbon stock, designated by the numeral 15 in Fig. 7, having projections 16 on the inner edge thereof and constituting the lugs 14 when properly positioned. The zig-zag bends are successively formed and simultaneously with such bending of the stock the projections 16 may be disposed at the desired angular relation to support the rails in substantially parallel relation, as illustrated in Fig. 1, or to tilt them inwardly or outwardly, as illustrated in Figs. 8 and 9.

It is desired to point out the structure of the Phillips Patent No. 2,656,230 has been commercialized to a large extent, but the applicant's present invention in any of the three embodiments may be much more economically produced than that of the Phillips patent and that the combined expander and spacer of that patent can not be modified to support the rails in outwardly or upwardly inclined relation to each other.

The embodiment of my invention shown in Figs. 10 to 14 inclusive is functionally the same as that shown in Figs. 1 to 8 inclusive, but the lugs 17 are struck out of ribbon stock 18 rather than projecting from the inner edge thereof, the stock having spaced pairs of transverse slits 19 extending from the inner edges thereof. The portions between the slits are bent outwardly on the dotted line 20 to form the tongues which are designated by the same numerals as in the embodiment shown in Figs. 1 to 9 inclusive because they perform the same use functions.

The embodiment shown in Figs. 1 to 9 inclusive is presently considered by applicant as the most desirable structure and is somewhat more economical to produce.

I have illustrated and described my invention in highly practical embodiments thereof. I have not attempted to illustrate or describe other modifications or adaptations as it is believed that this disclosure will enable those skilled in the art to embody or adapt the same as may be desired.

Having thus described the invention, what is claimed as new and desired to secure by Letters Patent is:

1. A piston ring assembly comprising axially spaced annular thin split cylinder wall engaging elements formed of ribbon steel coiled edgewise and having substantially flat sides, annular transversely curved inner edges, and annular peripheral cylinder wall engaging edges of substantially less width than the actual thickness of the elements and with side surfaces of substantial width merging into the sides of the elements, an annular split expansible resilient combined spacer and expander member formed of ductile metal corrugated sidewise and disposed radially edgewise between said cylinder wall engaging elements and having integral lug-like abutments disposed angularly to and projecting laterally from the inner edges of the bights thereof, said spacer and expander member being under spring compression with its ends in abutting relation when the assembly is installed in the piston ring groove under use compression, said spacer and expander member terminating at its ends in bight portions the end edges of which abut the opposed terminal cross reaches, both of the said terminal bight portions having an abutment extending from the inner edge thereof.

2. A piston ring assembly comprising axially spaced annular thin split cylinder wall engaging elements formed of ribbon steel coiled edgewise and having substantially flat sides, annular transversely curved inner edges, and annular peripheral cylinder wall engaging edges of substantially less width than the actual thickness of the elements and with side surfaces of substantial width merging into the sides of the elements, an annular split expansible resilient combined spacer and expander member formed of ductile metal corrugated sidewise and disposed radially edgewise between said cylinder wall engaging elements and having integral lug-like abutments disposed angularly to and projecting laterally from the inner edges of the bights thereof, said spacer and expander member being under spring compression with its ends in abutting relation when the assembly is installed in the piston ring groove under use compression, said spacer and expander member terminating at its ends in bight portions the end edges of which abut the opposed terminal cross reaches.

3. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof, said spacer and expander member being under spring compression with its ends in abutting relation when the assembly is installed in a piston ring groove under use compression, said spacer and expander member terminating at its ends in bight portions the end edges of which abut the opposed terminal cross reaches, both of said terminal bight portions having an abutment extending from the inner edge thereof.

4. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof, said spacer and expander member being under spring compression with its ends in abutting relation when the assembly is installed in a piston ring groove under use compression, said spacer and expander member terminating at its ends in bight portions the end edges of which abut the opposed terminal cross reaches.

5. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof and disposed in inwardly inclined relation thereto and acting to tilt said cylinder wall engaging elements disposed in angular relation to and projecting laterally from the bights, said spacer and expander member being under spring compression with its ends in abutting relation when the assembly is installed in a piston ring groove under use compression, said spacer and expander member terminating at its ends in bight portions the end edges of which abut the opposed terminal cross reach, both of said terminal bight portions having an abutment extending from the inner edge thereof.

6. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof and disposed in inwardly inclined relation thereto and acting to tilt said cylinder wall engaging elements disposed in angular relation to and projecting laterally from the bights, said spacer and expander member being under spring compression with its ends in abutting relation when the assembly is installed in a piston ring groove under use compression, said spacer and expander member terminating at its ends in bight portions the end edges of which abut the opposed terminal cross reach.

7. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof and disposed in outwardly inclined relation and acting to tilt said cylinder wall engaging members outwardly relative to said spacer and expander member, said spacer and expander member being under spring compression with its ends in abutting relation when the assembly is installed in a piston ring groove under use compression, said spacer and expander member terminating at its ends in bight portions the end edges of which abut the opposed terminal cross reach, both of said terminal bight portions having an abutment extending from the inner edge thereof.

8. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof, said spacer and expander member being under spring compression with its ends in abutting relation when the assembly is installed in a piston ring groove under use compression, said spacer and expander member terminating at its ends in bight portions, the end edge of one terminal bight abutting the terminal cross reach of the other end, both of said terminal bight portions having an abutment extending from the inner edge thereof.

9. A piston ring assembly comprising axially spaced annular thin split cylinder wall engaging elements, and an annular split expansible resilient combined spacer and expander member formed of ductile metal corrugated sidewise and disposed radially edgewise between said cylinder wall engaging elements and having integral lug-like abutments projecting laterally from the bights thereof, said spacer and expander member being under spring compression with its ends in abutting relation when the assembly is installed in a piston ring groove under use compression, said spacer and expander member terminating at its ends in bight portions, the end edge of one terminal bight abutting the terminal cross reach of the other end.

10. An annular split springably expansible combined spacer and expander member for piston ring elements formed of ductile metal corrugated sidewise with the corrugations disposed radially edgewise providing an annular series of bight portions and connecting reaches therefor, the bight portions having integral laterally projecting lug-like ring element abutments projecting from the inner edges thereof and disposed in angular relation thereto, said spacer and expander member terminating at both ends in bight portions, the end edge of one terminal bight portion of one end being in thrust engagement with the terminal reach of the other end when the spacer and expander member is under compression stress as in use, both of said terminal bight portions having a ring element abutment extending from the inner edge thereof.

11. An annular split springably expansible combined spacer and expander member for piston ring elements formed of ductile metal corrugated sidewise with the corrugations disposed radially edgewise providing an annular series of bight portions and connecting reaches therefor, the bight portions having integral laterally projecting lug-like ring element abutments projecting from the inner edges thereof and disposed in angular relation thereto, said spacer and expander member terminating at both ends in bight portions, the end edge of one terminal bight portion of one end being in thrust engagement with the terminal reach of the other end when the spacer and expander member is under compression stress as in use.

12. An annular split springably expansible combined spacer and expander member for piston ring elements formed of ductile metal corrugated sidewise with the corrugations disposed radially edgewise providing an annular series of bight portions and connecting reaches therefor, the bight portions having integral laterally projecting lug-like cylindrical wall engaging ring element abutments bent outwardly therefrom and disposed in angular relation thereto, said spacer and expander member terminating at both ends in bight portions, the end edge of one terminal bight portion of one end being in thrust engagement with the terminal reach of the other end when the spacer and expander member is under compression stress as in use, both of said terminal bight portions having a ring element abutment extending from the inner edge thereof.

13. An annular split springably expansible combined spacer and expander member for piston ring elements formed of ductile metal corrugated sidewise with the corrugations disposed radially edgewise providing an annular series of bight portions and connecting reaches therefor, the bight portions having integral laterally projecting lug-like cylindrical wall engaging ring element abutments bent outwardly therefrom and disposed in angular relation thereto, said spacer and expander member terminating at both ends in bight portions, the end edge of one terminal bight portion of one end being in thrust engagement with the terminal reach of the other end when the spacer and expander member is under compression stress as in use.

14. An annular split springably expansible combined spacer and expander member for piston ring elements formed of a strip of ductile metal having longitudinally spaced lug-like projections on its inner edge, the strip being corrugated sidewise providing an annular series of ring element supporting bights and connecting reaches therefor, the lug-like projections on said bights being bent to project angularly and laterally outward therefrom and constituting ring element supports, said member terminating at its ends in bight portions, the end edge of one terminal bight portion at one end being in thrust engagement with the terminal reach at the other end when the member is under compression stress as in use, there being an abutment element extending from the inner edge of both of said terminal bight portions.

15. An annular split springably expansible combined spacer and expander member for piston ring elements formed of a strip of ductile metal having longitudinally spaced lug-like projections on its inner edge, the strip being corrugated sidewise providing an annular series of ring element supporting bights and connecting reaches therefor, the lug-like projections on said bights being bent to project angularly and laterally outward therefrom and constituting ring element supports, said member terminating at its ends in bight portions, the end edge of one terminal bight portion at one end being in thrust engagement with the terminal reach at the other end when the member is under compression stress as in use.

References Cited in the file of this patent

UNITED STATES PATENTS

| 2,712,971 | Phillips | July 12, 1955 |
| 2,713,527 | Hsia-Si Pien | July 19, 1955 |
| 2,833,606 | Brenneke | May 6, 1958 |

FOREIGN PATENTS

| 555,348 | Great Britain | Aug. 18, 1943 |